(12) United States Patent
Hirota (10) Patent No.: US 9,787,241 B2
(45) Date of Patent: Oct. 10, 2017

(54) MOTOR DRIVING DEVICE FOR CONTROLLING MOTOR WITH PULSE SIGNAL

(71) Applicant: CANON KABUSHIKI KAISHA, Tokyo (JP)

(72) Inventor: Junichi Hirota, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/171,147

(22) Filed: Jun. 2, 2016

(65) Prior Publication Data

US 2016/0373045 A1    Dec. 22, 2016

(30) Foreign Application Priority Data

Jun. 16, 2015  (JP) ................................. 2015-121424
Apr. 28, 2016  (JP) ................................. 2016-091655

(51) Int. Cl.
*H02P 1/00*   (2006.01)
*H02P 27/08*  (2006.01)

(52) U.S. Cl.
CPC .................................... *H02P 27/08* (2013.01)

(58) Field of Classification Search
CPC ........ H02M 2001/0009; H02M 7/5395; H02P 27/08; H02P 7/04; H02P 7/29
See application file for complete search history.

(56) References Cited

U.S. PATENT DOCUMENTS 5,574,344 A       11/1996  Matsuoka et al.
2016/0308483 A1*  10/2016  Ogoshi ..................... H02P 7/04

FOREIGN PATENT DOCUMENTS

JP    H08-099645 A    4/1996

\* cited by examiner

*Primary Examiner* — Karen Mash
(74) *Attorney, Agent, or Firm* — Fitzpatrick, Cella, Harper & Scinto (57) ABSTRACT

A motor driving device includes a control unit configured to control a motor by obtaining a driving current of the motor, and generating a PWM signal for turning on/off a plurality of switching elements based on a difference between the driving current and a target value. If a time period in which the PWM signal is at the high level is longer than a predetermined time period, the control unit performs sampling of an electric current during the time period in which the PWM signal is at the high level, whereas if the time period in which the PWM signal is at the high level is shorter than or equal to the predetermined time period, the control unit does not perform the sampling of the electric current during the time period in which the PWM signal is at the high level.

14 Claims, 10 Drawing Sheets

MOTOR DRIVING DEVICE FOR CONTROLLING MOTOR WITH PULSE SIGNAL

BACKGROUND OF THE INVENTION

Field of the Invention

The present invention relates to a motor driving device for driving a motor.

Description of the Related Art

Figure 8:
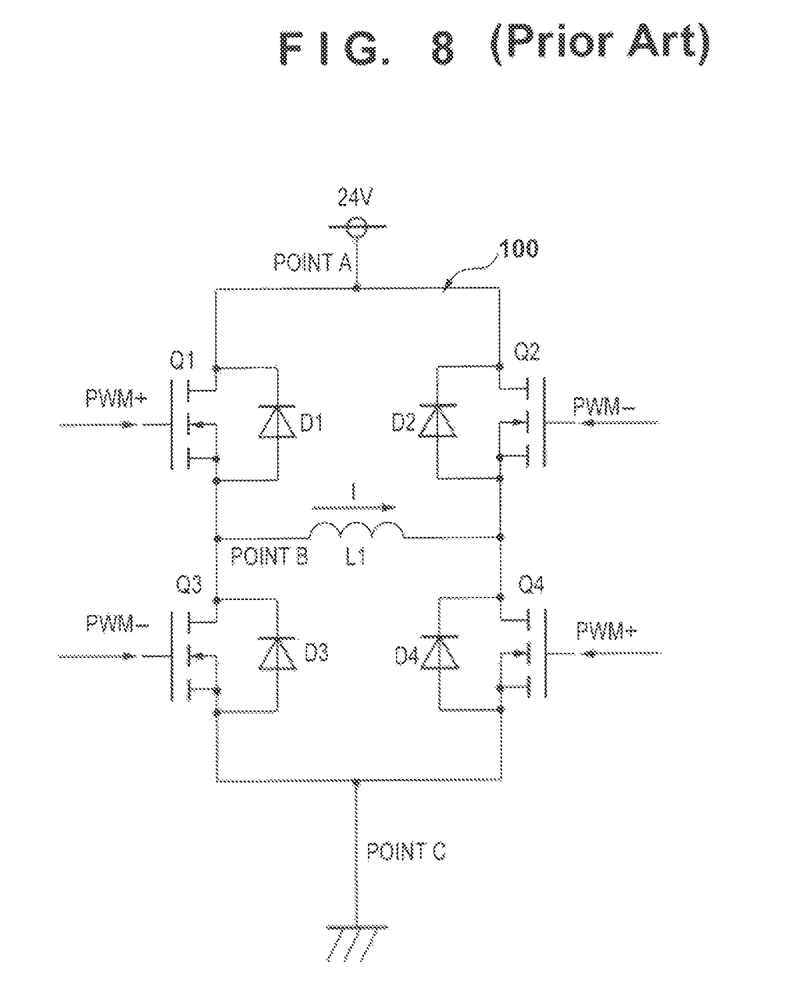
FIG. 8 is a diagram illustrating a configuration of a motor driving circuit according to an embodiment.

FIG. 8 is a diagram illustrating a configuration of an ordinary motor driving circuit 100. Four FETs Q1 to Q4 (hereinafter, referred to simply as Q1 to Q4) are connected to each other in a bridge configuration, and a coil L1 of a motor is connected so as to bridge the connection points of Q1 and Q3, and the connection points of Q2 and Q4. In FIGS. 8, Q1 to Q4 are n-channel FETs, and the drain terminals of Q1 and Q2 are connected to a terminal of a 24V-power supply. Furthermore, the source terminals of Q3 and Q4 are connected to the ground (GND). Furthermore, Q1 and Q4 are driven with the same PWM signal PWM+, and Q2 and Q3 are driven with the same PWM signal PWM−. Note that PWM+ and PWM− have a relationship in which their phases are opposite each other.

Figure 9:
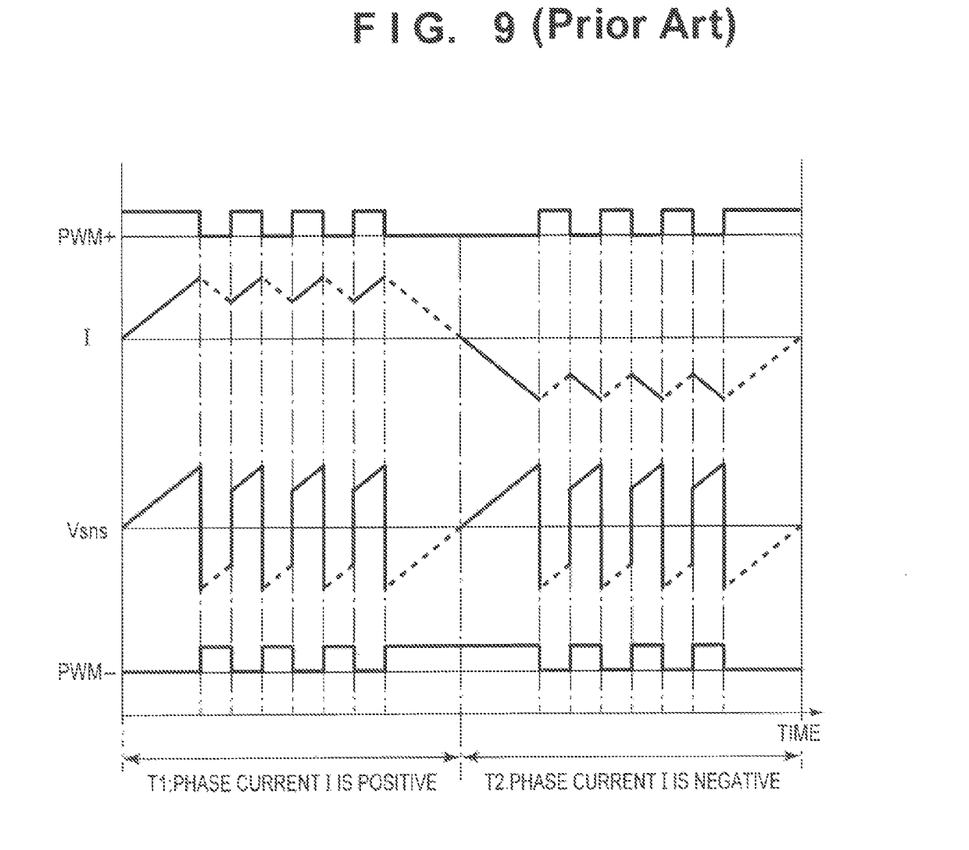
FIG. 9 is a diagram illustrating a phase current.

The following will describe an operation of the motor driving circuit 100 with reference to FIG. 9. Note that in FIG. 9, a time period T1 is a time period in which a phase current I flowing through the coil L1 of FIG. 8 is positive (in the direction of the arrow), and a time period T2 is a time period in which the phase current I is negative (in the direction opposite to the arrow). Note that the phase current is a driving current for driving a motor. During the time period T1 in which the phase current I is positive, when PWM+ is high, the phase current I flows as shown by the solid lines of FIG. 9. Then, when PWM+ is low, an induced electromotive voltage is generated in the coil L1 in a direction in which it prevents a change in the electric current. This induced electromotive voltage is predominant compared to the 24V of the power supply for driving a motor, and the phase current I flows as shown by the dotted lines of FIG. 9 (regenerative current). On the other hand, during the time period T2 in which the phase current I is negative, when PWM+ is low, the phase current I flows as shown by the solid lines of FIG. 9, and then when PWM+ is high, the phase current I flows, as shown in the dotted lines, due to the induced electromotive voltage generated in the coil L1.

In order to drive the motor driving circuit 100 appropriately, a control unit for controlling the motor needs to detect the phase current I. Points A, B, and C of FIG. 8 are points at which the phase current I may be detected. Here, if the electric current is to be detected at the points A and B, a current detection unit to which a high voltage of 24V can be input will need to be provided, resulting in an increase in the cost. On the other hand, if the electric current is to be detected at the point C, electric current detection will be possible using an inexpensive part. However, during the time period T1 in which the direction of the phase current I is positive, when PWM+ is high, an electric current flows from the power supply terminal toward GND via Q1, the coil L1, and Q4 in the stated order. On the other hand, during the time period T1 in which the direction of the phase current I is positive, when PWM+ is low, an electric current flows from GND toward the power supply terminal via Q3, the coil L1, and Q2 in the stated order. In other words, during the time period T1 in which the direction of the phase current I is positive, the electric currents flowing in two directions, namely, the direction toward GND and the direction from GND, both pass through the point C. The same applies to the time period in which the direction of the phase current I is negative. In other words, if a detection resistor is provided at the point C so as to obtain voltages Vsns at its two ends, only the waveform shown in FIG. 9 will be obtained, and the direction of the phase current cannot be determined.

Accordingly, U.S. Pat. No. 5,574,344 discloses a configuration in which, when a differential amplifier amplifies a voltage of a detection resistor provided at the point C, the polarity of the voltage of the detection resistor that is input to the differential amplifier is switched in synchronization with a PWM signal.

Figure 10:
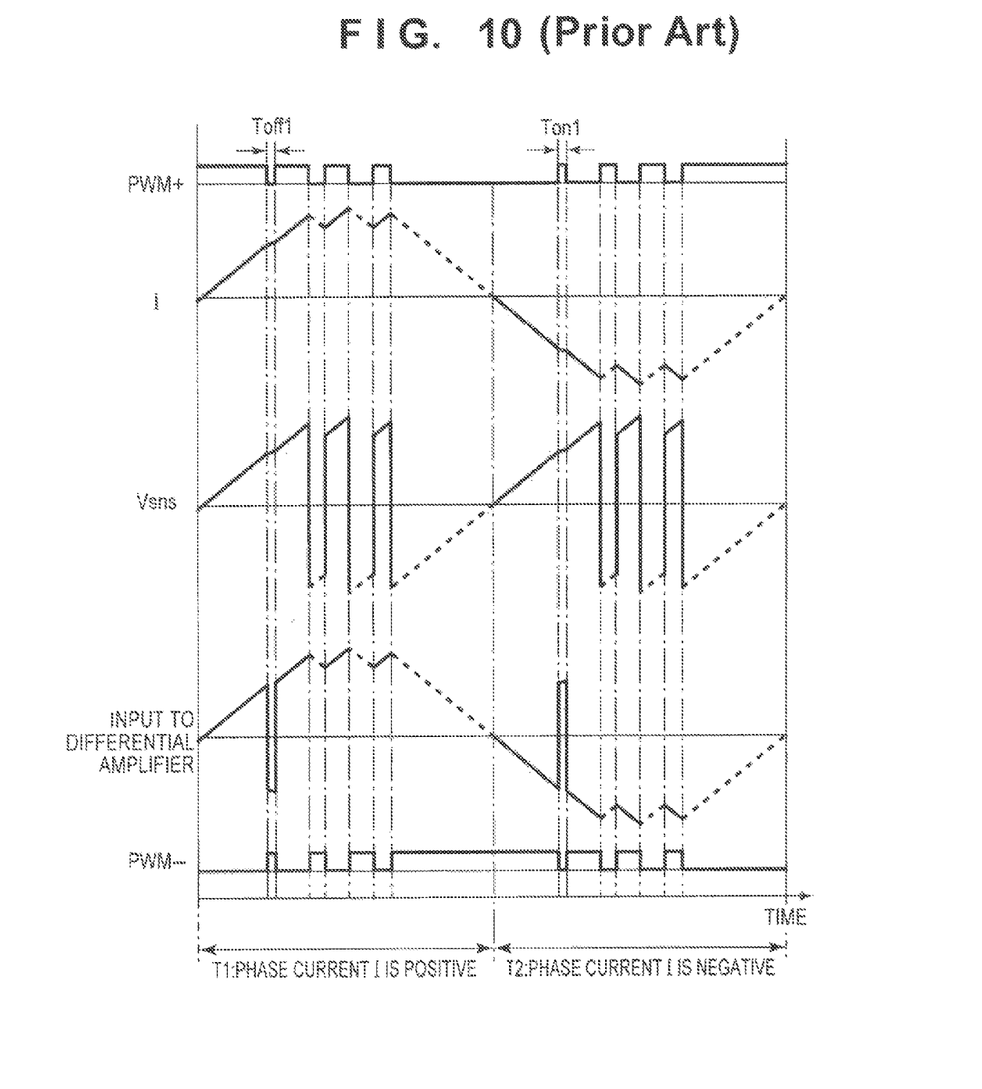
FIG. 10 is a diagram illustrating an operation of the motor driving circuit when a time period in which a PWM signal is high or low is short.

FIG. 10 is a timing chart of signals when the time period in which the PWM signal is high or low is very short. In FIG. 10, for example, during the time period T1 in which the phase current is positive, PWM+ is low only during a very short time period Toff1. In this very short time period Toff1, where PWM+ is low, Q1 and Q4 are ideally in the OFF state, but are actually kept in the ON state. This is because, during the time period Toff1, the gate charges of Q1 and Q4 are not sufficiently discharged, and thus the voltages between the gates and the sources do not become lower than a threshold voltage. Accordingly, as shown in FIG. 10, during the time period Toff1, the voltage Vsns remains positive, and as a result, an input to the differential amplifier of the configuration of U.S. Pat. No. 5,574,344 is negative as shown in FIG. 10. Accordingly, also the configuration of U.S. Pat. No. 5,574,344 cannot correctly detect the phase current I. Furthermore, there is a risk that the switching of the PWM signal between high and low will generate switching noise in Q1 to Q4, and the generated switching noise will overlap with the detected current value. Also in this case, it is not possible to correctly detect the phase current I.

SUMMARY OF THE INVENTION

According to an aspect of the present invention, a motor driving device includes: a driving unit including a plurality of switching elements connected to each other in a bridge configuration, and configured to supply a driving current to a motor; a detection unit configured to detect an electric current flowing between the driving unit and a ground; and a control unit configured to control the motor by obtaining a driving current based on a detection result detected by the detection unit, and generating a PWM signal for turning on/off the plurality of switching elements based on a difference between the obtained driving current and a target value of the driving current to be supplied to the motor. If the PWM signal is at a high level, and a time period in which the PWM signal is at the high level is longer than a predetermined time period, the control unit performs sampling of an electric current with the detection unit during the time period in which the PWM signal is at the high level, whereas if the PWM signal is at a high level but the time period in which the PWM signal is at the high level is shorter than or equal to the predetermined time period, the control unit does not perform the sampling of the electric current with the detection unit during the time period in which the PWM signal is at the high level.

Further features of the present invention will become apparent from the following description of exemplary embodiments with reference to the attached drawings.

DESCRIPTION OF THE EMBODIMENTS

Hereinafter, exemplified embodiments of the present invention will be described with reference to the drawings. Note that the embodiments below are examples, and the present invention is not limited to the content of the embodiments. Furthermore, in the drawings below, constituent components that are not essential for the description of the embodiments are omitted from the drawings.

First Embodiment

Figure 1:
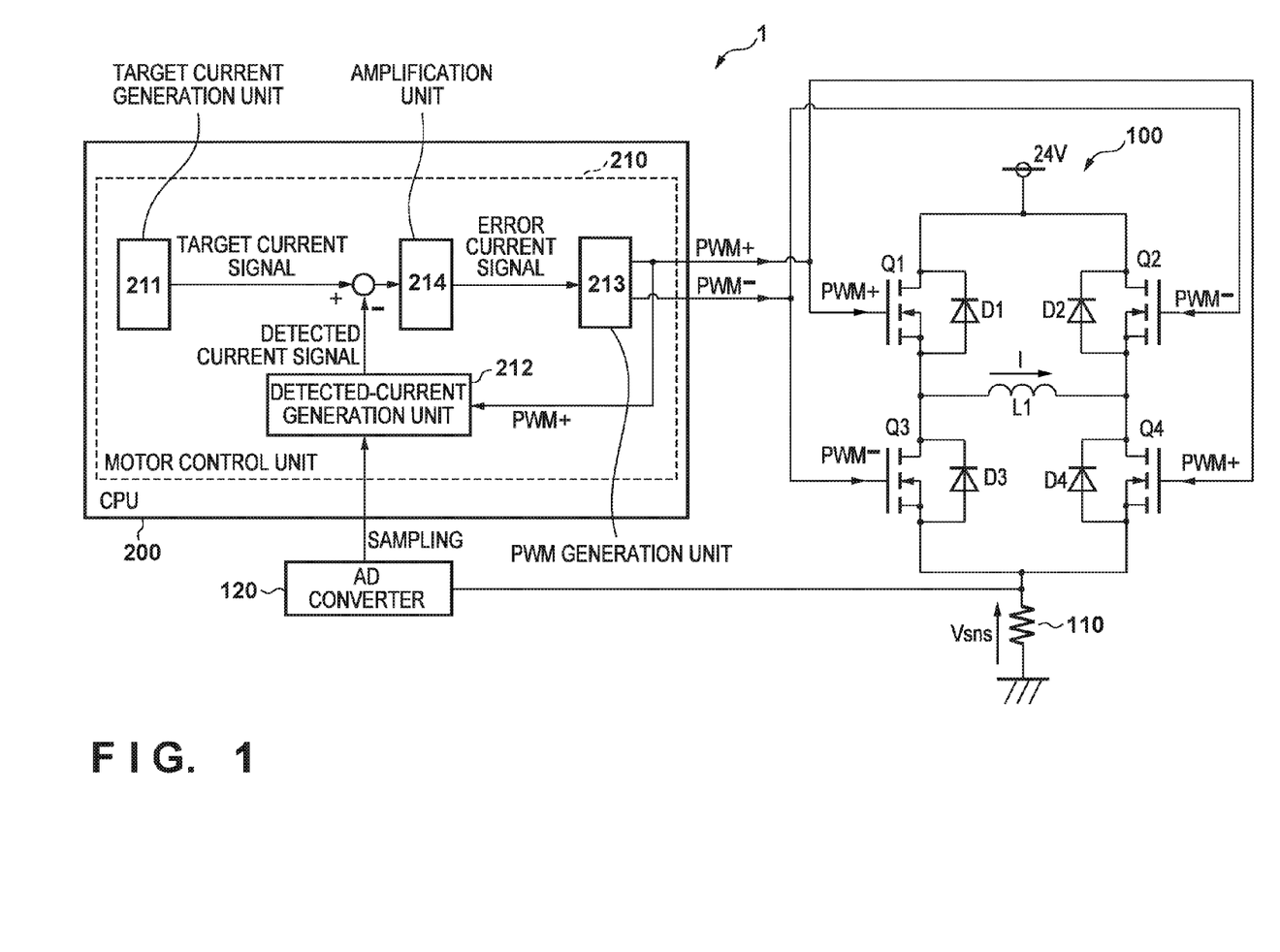
FIG. 1 is a diagram schematically illustrating a configuration of a motor driving device according to a first embodiment.

FIG. 1 is a diagram illustrating a configuration of a motor driving device 1 according to an embodiment. Note that the configuration and operations of a motor driving circuit 100 of the motor driving device 1 are similar to those described with reference to FIGS. 8 and 9, and thus redundant descriptions thereof are omitted. A detection resistor 110 is provided between the connection points of Q3 and Q4 of the motor driving circuit 100, and GND, in order to detect an electric current flowing between the motor driving circuit 100 and GND. Note that in the detection resistor 110, a voltage Vsns is generated according to the amplitude of a phase current I, which is a driving current for driving a motor. An analog/digital (A/D) converter 120 converts the voltage Vsns, which has an analog value, into a digital value and outputs the converted voltage Vsns, upon receiving a sampling request from a motor control unit 210. In the present embodiment, the motor control unit 210 is realized by a CPU 200 executing a program. However, the motor control unit 210 may be realized by hardware. Furthermore, it is also possible that part of the processing of the motor control unit 210 that will be described below is executed by the CPU 200, and the remaining processing is realized by hardware. A target current generation unit 211 outputs a target value of the phase current I to run to a coil L1 as a target current signal. For example, assuming that the phase current I is 1 ampere, the target current signal is a signal in which information representing the amplitude of +1 ampere and information representing the amplitude of −1 ampere change with respect to each other according to the frequency. A detected-current generation unit 212 generates a detected current signal that corresponds to the phase current I, based on the sampled value from the A/D converter 120 and PWM+ output by a PWM generation unit 213. Note that in the present embodiment, PWM+ is input to the detected-current generation unit 212, but a configuration is also possible in which PWM− is input because PWM+ and PWM− have phases that are opposite each other.

As described with reference to FIG. 10, the polarity of the voltage Vsns does not coincide with the direction of the phase current I. Accordingly, when PWM+ is low, the detected-current generation unit 212 generates a detected current signal by inverting the polarity of the voltage Vsns. Accordingly, the polarity of the detected current signal corresponds to the direction of the phase current I.

An amplification unit 214 amplifies an error, which is a difference between the target current signal and the detected current signal, and outputs the resulting signal serving as an error current signal to the PWM generation unit 213. The gain of the amplification unit 214 is the sum of a proportional gain and an integral gain. The PWM generation unit 213 compares the error current signal with a triangular carrier wave of a predetermined cycle, and thereby generates PWM+ and PWM− that are to be output to the motor driving circuit 100. In this way, the motor control unit 210 performs feedback control by detecting the phase current using the voltage Vsns of the detection resistor 110, and correcting its polarity based on PWM+.

Figure 2:
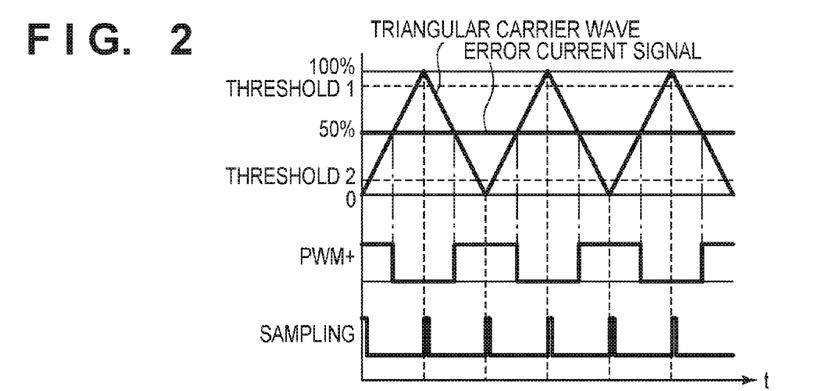
FIG. 2 is a timing chart of signals according to the first embodiment.

The following will describe the relationship between PWM signal generation by the motor control unit 210 and sampling of the A/D converter 120. FIG. 2 shows the relationship between a triangular carrier wave (hereinafter, referred to simply as "triangular wave") of a predetermined frequency, an error current signal, PWM+, and timing at which the motor control unit 210 performs sampling of an output of the A/D converter 120. The PWM generation unit 213 generates PWM+ and PWM− by comparing the error current signal with the triangular wave. More specifically, when the value (amplitude) of the error current signal is greater than or equal to the value (amplitude) of the triangular wave, PWM+ is at a high level, and otherwise, PWM+ is at a low level. Accordingly, when the value of the error current signal remains greater than or equal to the maximum value of the triangular wave, the duty ratio is 100%, and when the value of the error current signal remains smaller than or equal to the minimum value of the triangular wave, the duty ratio is 0%. Note that the duty ratio refers to the ratio of a time period in which PWM+ is high in one cycle of PWM+.

In the present embodiment, two thresholds (threshold 1 and threshold 2) that are not smaller than the minimum value and not larger than the maximum value of the triangular wave are set. Here, it is assumed that the threshold 1 is larger than the threshold 2. For example, the threshold 1 may be set to 95% of the maximum value of the triangular wave, and the threshold 2 may be set to 5% of the maximum value of the triangular wave. The motor control unit 210 ordinarily samples an output of the A/D converter 120 at timings at which the triangular wave is largest and at which the triangular wave is smallest. Also, the detected-current generation unit 212 generates a detected current signal based on the sampled value and whether PWM+ is high or low. FIG. 2 shows PWM+ and sampling timings when the value of the error current signal is between the threshold 1 and the threshold 2. However, as described above, if the time period in which PWM+ or PWM− is high or low is very short, the sign of the detected current signal that is generated in this short time period will not correctly represent the direction of the phase current I. Accordingly, in the present embodiment, if the error current signal satisfies any one of the following two conditions, the sampling will not be performed. The condition 1 is a condition in which the value of the error current signal is greater than or equal to the threshold 1, and PWM+ is low. The condition 2 is a condition in which the value of the error current signal is smaller than or equal to the threshold 2, and PWM+ is high. The state that satisfies one of the conditions is a state in which the time period in which PWM+ is at a high level is a predetermined time period or shorter, or a state in which the time period in which PWM+ is at a low level is the predetermined time period or shorter. Accordingly, when the time period in which PWM+ is at a high level is the predetermined time period or shorter, the sampling is not performed during this high-level time period, and when the time period in which PWM+ is at a low level is the predetermined time period or shorter, the sampling is not performed during this low-level time period. Similarly, when the time period in which PWM− is at a high level is the predetermined time period or shorter, the sampling is not performed during this high-level time period, and when the time period in which PWM− is at a low level is the predetermined time period or shorter, the sampling is not performed during this low-level time period.

Figure 3A:
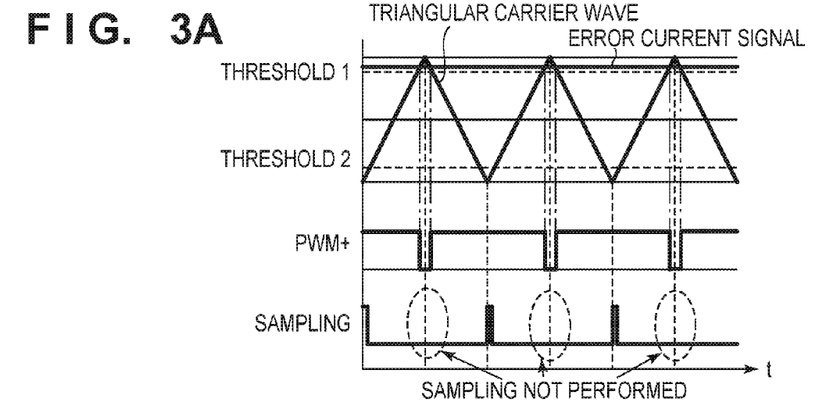
FIGS. 3A and 3B are timing charts of the signals according to the first embodiment.
Figure 3B:
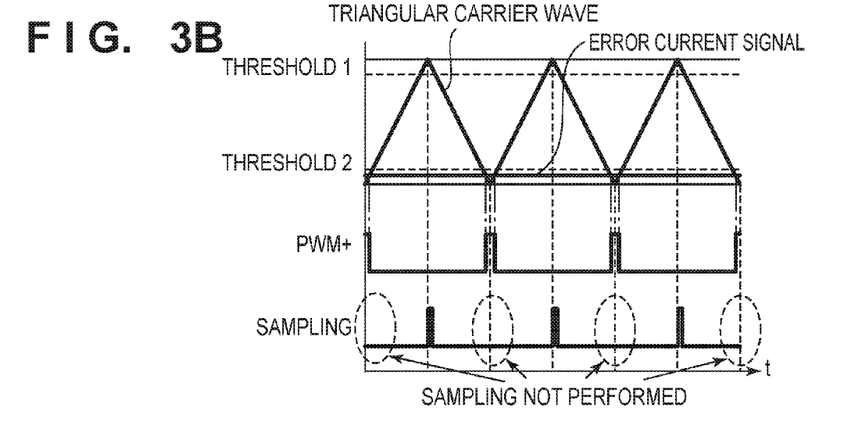

FIG. 3A shows the case where the error current signal satisfies the condition 1. As shown in FIG. 3A, if the value of the error current signal is higher than the threshold 1, the time period in which PWM+ is at a low level will be very short, the PWM+ at a low level being due to the value of the triangular wave becoming greater than or equal to the value of the error current signal. Accordingly, the detected current signal based on the sampled value at this time does not correctly represent the actual phase current I. Accordingly, as shown in FIG. 3A, if the error current signal satisfies the condition 1, the sampling will not be performed. FIG. 3B shows the case where the error current signal satisfies the condition 2. As shown in FIG. 3B, if the value of the error current signal is lower than the threshold 2, the time period in which PWM+ is at a high level will be very short, the PWM+ at a high level being due to the value of the triangular wave becoming smaller than the value of the error current signal. Accordingly, the detected current signal based on the sampled value at this time does not correctly represent the actual phase current I. Therefore, as shown in FIG. 3B, if the error current signal satisfies the condition 2, the sampling will not be performed. Note that even if the error current signal satisfies the condition 1 or the condition 2 at a sampling timing, a drastic change in the error current signal thereafter may result in the extension of the time period in which the PWM signal is high or low. However, in actually, the change in the error current signal is slow, and thus it is rare to have cases in which the time period in which the PWM signal is high or low is extended as a result, despite the error current signal satisfying the condition 1 or the condition 2.

According to the present embodiment, since the sampling is not performed if the error current signal satisfies the condition 1 or the condition 2, the value of the detected current signal that was obtained at the last sampling timing or at a previous sampling time is used in place of the detected current signal at the present sampling timing. Note that the detected-current generation unit 212 stores the value of the detected current signal that was obtained at a sampling timing until the next sampling timing. Accordingly, even if the time period in which the PWM signal is high or low is very short, it is possible to reduce the difference between the current detection result based on the voltage Vsns and the actual phase current I, and to detect a motor current with higher accuracy than in the conventional case. As a result, it is possible to achieve stable motor current control.

Figure 4:
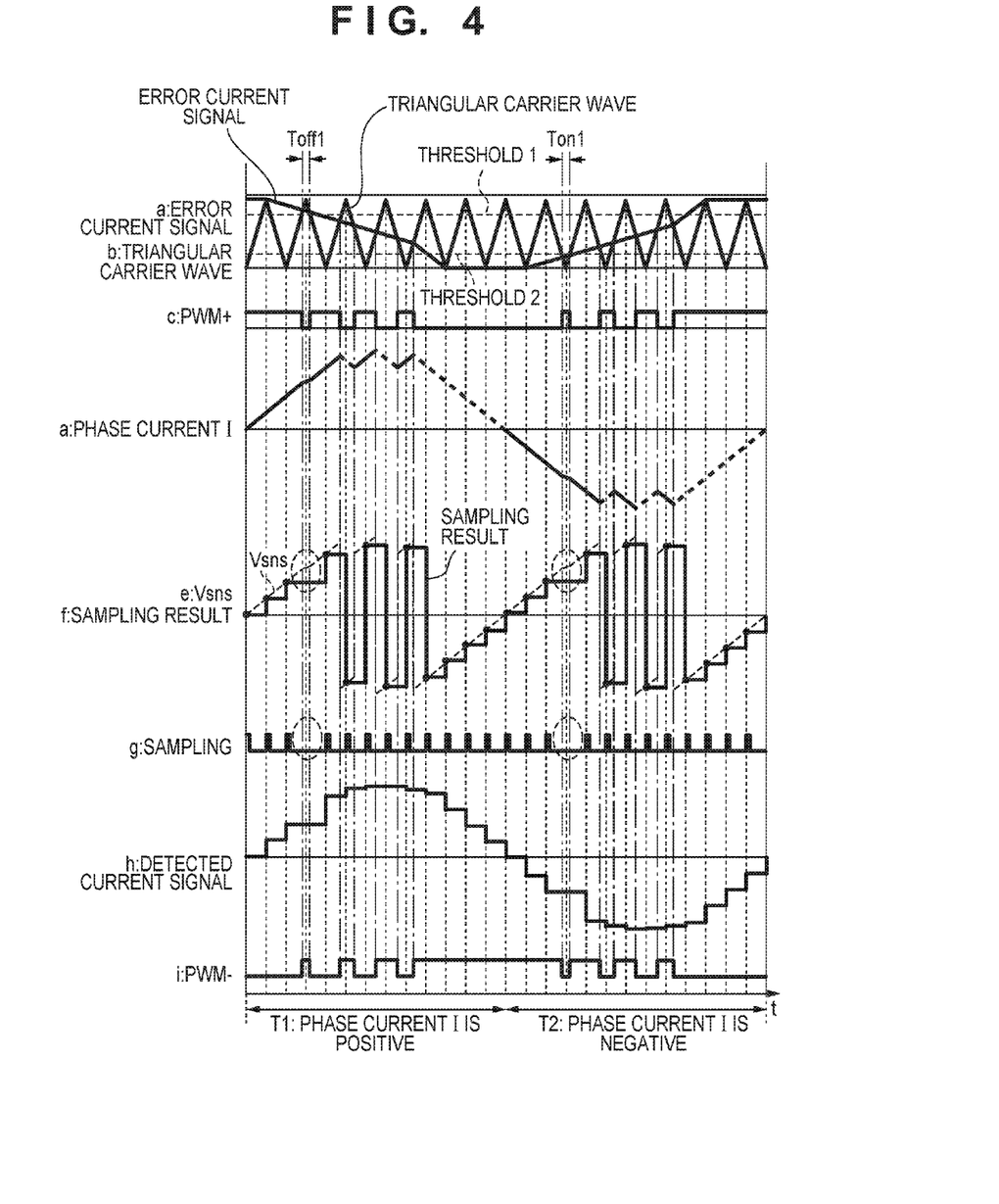
FIG. 4 is a timing chart of the signals according to the first embodiment.

FIG. 4 is a timing chart illustrating the relationship between the signals. The motor control unit 210 samples, at each sampling timing, an output of the A/D converter 120, that is, a digital value converted from the voltage Vsns. The results thereof are shown as sampling results. The motor control unit 210 generates detected current signals, which are detected values of the phase current I, using the sampling results and information indicating whether PWM+ is high or low. Specifically, if PWM+ is high, the motor control unit 210 outputs the sampled value without any change, and if PWM+ is low, the motor control unit 210 generates a detected current signal by inverting the polarity of the sampled value and outputting the inverted sampled value.

Note that at the sampling timings during the time periods Toff1 and Ton1 of FIG. 4, the error current signal satisfies either of the above-described conditions, and thus the sampling is not performed. The detected-current generation unit 212 thus outputs the value of the detected current signal that was output at one sampling timing before the timing at which the sampling was not performed, without any change. Accordingly, even if the time period in which the PWM signal is high or low is very short, it is possible to reduce the difference between the detection result of the phase current I based on the voltage Vsns and the actual phase current I more so than in the conventional case.

Figure 5:
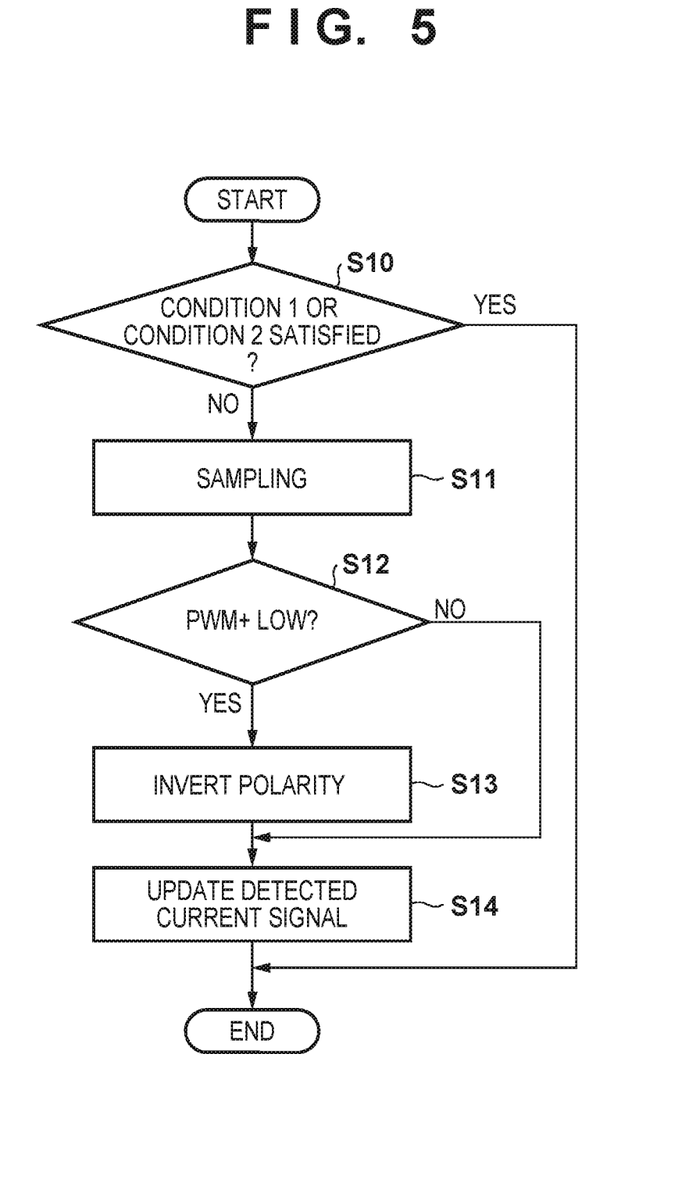
FIG. 5 is a flowchart of processing of a motor control unit according to the first embodiment.

FIG. 5 is a flowchart of processing in which the detected-current generation unit 212 generates a detected current signal according to the present embodiment. The processing of FIG. 5 is to be performed at a predetermined sampling timing, namely, in the present embodiment, at a timing at which the amplitude of the triangular wave is maximum or minimum. In step S10, the detected-current generation unit 212 determines whether or not the error current signal satisfies the condition 1 or the condition 2. If it is determined that the error current signal does not satisfy either of the conditions, the detected-current generation unit 212 samples, in step S11, an output of the A/D converter 120. Then, in step S12, the detected-current generation unit 212 determines whether or not PWM+ was low at the time of the sampling in step S11. If it is determined that PWM+ was low, the detected-current generation unit 212 inverts the polarity of the sampled value obtained in step S11, and in step S14, the detected-current generation unit 212 updates the value of the detected current signal to the inverted sampled value. On the other hand, if it is determined in step S12 that PWM+ was high, the detected-current generation unit 212 updates, in step S14, the value of the detected current signal to the sampled value obtained in step S11. Furthermore, if, in step S10, the error current signal satisfies either of the conditions, the detected-current generation unit 212 ends the procedure without updating the value of the detected current signal.

As described above, in the present embodiment, if the value of the error current signal at a sampling timing is not within a predetermined range, the value of the detected current signal obtained at the last sampling timing is used as the value at the present sampling timing. On the other hand, if the value of the error current signal is within the predetermined range at the sampling timing, the value of the detected current signal is obtained based on the current value detected using the detection resistor 110. Note that the predetermined range is determined such that a period of time in which the logical values (high/low) of PWM+ and PWM−, which are pulse signals, do not change is longer than a predetermined period of time. Note that the predetermined period of time refers to a period of time longer than the period of time that is required for the switching elements Q1 to Q4 of the motor driving circuit 100 to switch on/off. With the foregoing configuration, it is possible to correctly determine the value and direction of the phase current I, and to achieve stable motor control.

Second Embodiment

The following describes a second embodiment with a focus on differences from the first embodiment. In the first embodiment, if the error current signal satisfies the condition 1 or the condition 2, sampling is not performed, as shown in FIG. 5. In the present embodiment, sampling of an output of the A/D converter 120 is performed at every predetermined timing, namely, in the present embodiment, every timing at which the amplitude of the triangular wave is maximum or minimum. However, if the error current signal satisfies the condition 1 or the condition 2, the detected current will not be updated to the sampled value, and the current value that was detected at the last sampling timing and was stored in the detected-current generation unit 212 is maintained.

Figure 6:
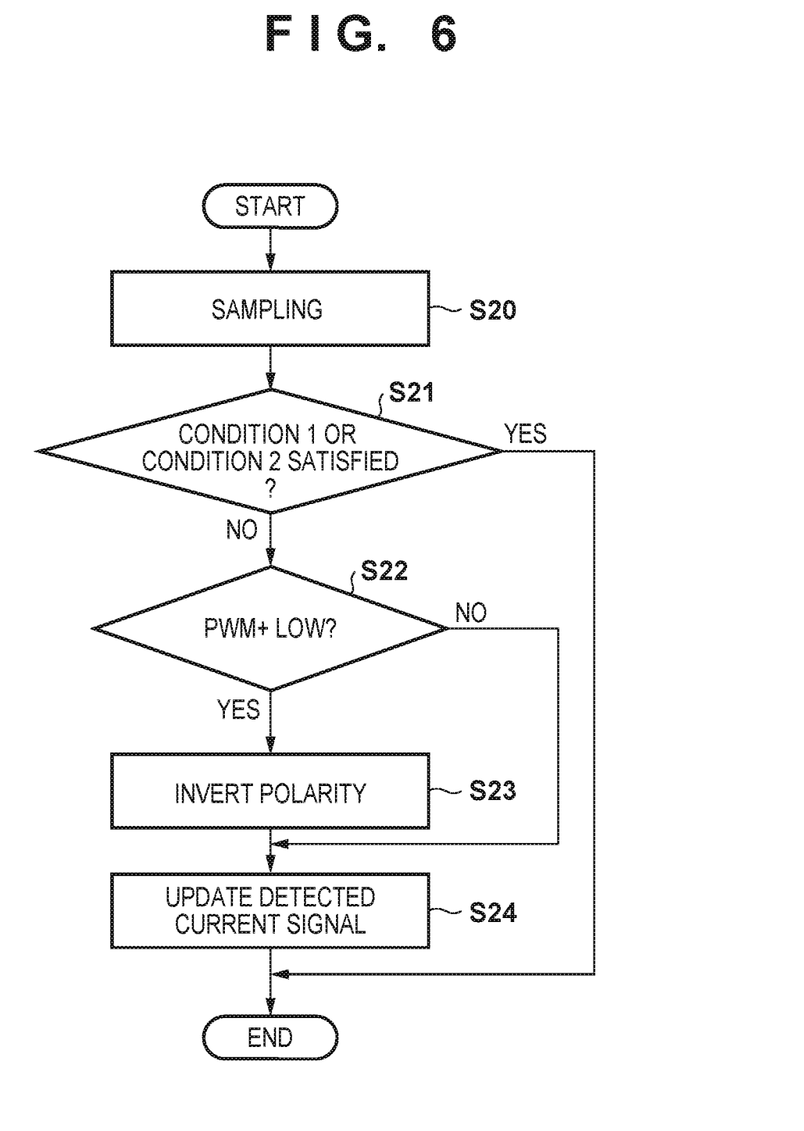
FIG. 6 is a flowchart of processing of a motor control unit according to a second embodiment.

FIG. 6 is a flowchart of processing in which the detected-current generation unit 212 generates a detected current signal according to the present embodiment. The detected-current generation unit 212 samples, in step S20, an output of the A/D converter 120, and determines, in step S21, whether or not the error current signal satisfies the condition 1 or the condition 2. If it is determined that the error current signal does not satisfy either of the conditions, the detected-current generation unit 212 determines, in step S22, whether or not PWM+ was low at the time of the sampling in step S20. If it is determined that PWM+ was low, the detected-current generation unit 212 inverts the polarity of the sampled value obtained in step S20, and updates, in step S24, the value of the detected current signal to the inverted sampled value. On the other hand, if it is determined in step S22 that PWM+ was high, the detected-current generation unit 212 updates, in step S24, the value of the detected current signal to the sampled value obtained in step S20. Furthermore, if, in step S21, the error current signal satisfies either of the conditions, the detected-current generation unit 212 ends the procedure without updating the value of the detected current signal.

Third Embodiment

The following describes a third embodiment with a focus on differences from the first and second embodiments. In the first and second embodiments, if the error current signal satisfies the condition 1 or the condition 2, the value of the detected current signal at the last sampling timing is regarded as the value of the detected current signal at the present sampling timing. In the present embodiment, if the error current signal satisfies the condition 1 or the condition 2, the value of the detected current signal at a sampling timing is estimated based on the detected current signal at the last sampling timing, and the estimated value is output.

In the present embodiment, the motor control unit 210 has stored an inductance value of the coil L1 in advance. For example, it is assumed that a time t1 is a sampling timing, and a time t2 is the sampling timing that follows the time t1. It is further assumed that "$\Delta t$" is a sampling interval t2−t1, "L" is an inductance value of the coil L1, and "V" is a power supply voltage (24V of FIG. 1) of the motor. In this case, a difference $\Delta I$ between a phase current I1 at the time t1 and a phase current I2 at the time t2 can be estimated to be $\Delta I=(V \times \Delta t)/L$. Accordingly, if the error current signal satisfies the condition 1 or the condition 2 at the time t2, the detected current signal value I2 at the time t2 can be estimated based on the detected current signal value I1 at the time t1, and given as $I2=I1+(V \times \Delta t)/L$. Note that the phase current I1 is stored in the detected-current generation unit 212 each time it is detected.

Figure 7:
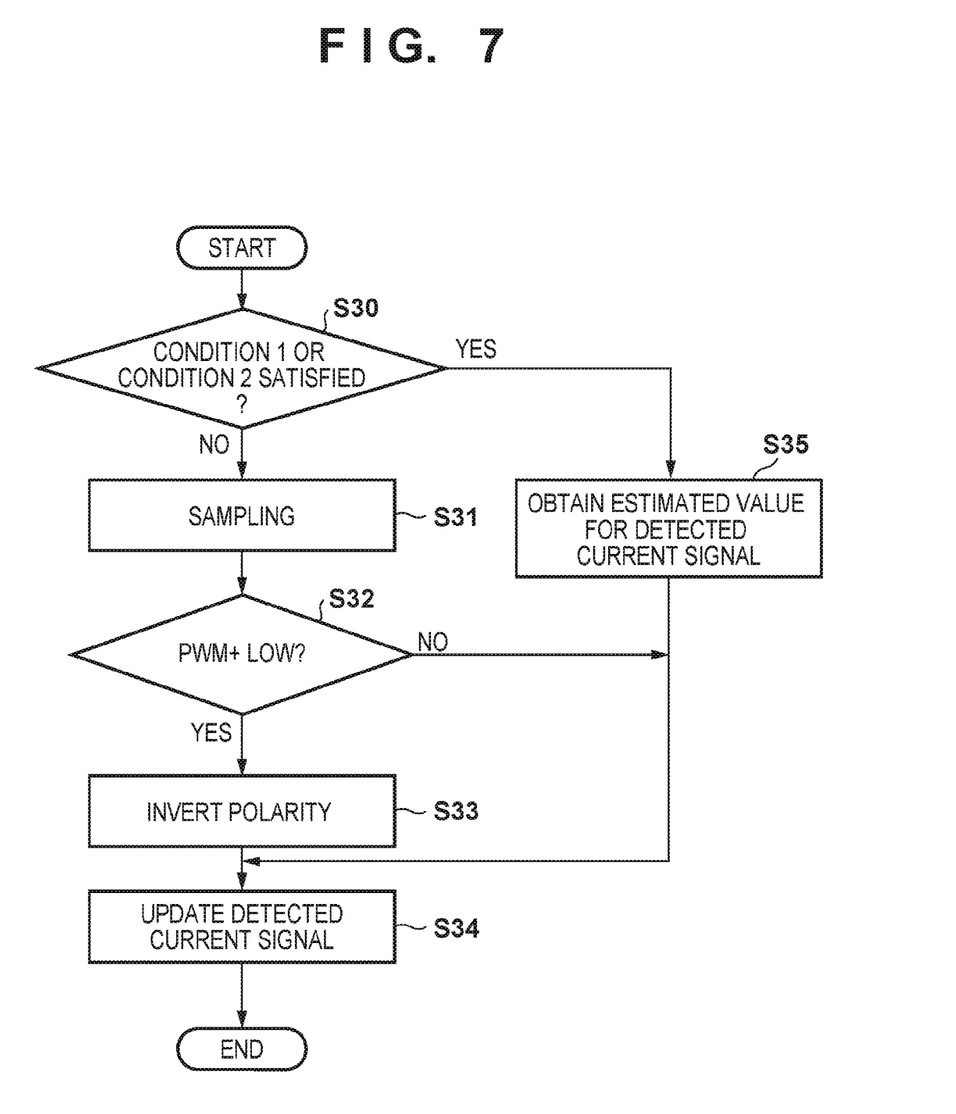
FIG. 7 is a flowchart of processing of a motor control unit according to the first embodiment.

FIG. 7 is a flowchart of processing in which the detected-current generation unit 212 generates a detected current signal according to the present embodiment. The present embodiment differs from the first embodiment shown in FIG. 5 in that if, in step S30 of FIG. 7, the error current signal satisfies the condition 1 or the condition 2, the estimated value for the detected current signal is determined in the above-described manner in step S35, and the detected current signal is updated to the estimated value in step S34. Note that the procedure that is performed if, in step S30, the error current signal does not satisfy the condition 1 and the condition 2 is the same as that of the first embodiment. Note that a configuration is also possible in which if, in step S21 shown in FIG. 6 of the second embodiment, the error current signal satisfies the condition 1 or the condition 2, the estimated value for the detected current signal is determined, and the detected current signal is updated to the estimated value.

As described above, in the present embodiment, if the value of the error current signal at a sampling timing is not within a predetermined range, the estimated value for the detected current signal at the present sampling timing is determined based on the value of the detected current signal obtained at the last sampling timing. With this configuration, the phase current I can be determined more accurately, thus making it possible to control the motor more accurately.

Summary

As described above, the foregoing embodiments disclose configurations for accurately detecting a driving current that is to be supplied to a motor by the motor driving circuit 100, which includes a plurality of switching elements FETs connected to each other in a bridge configuration. Specifically, the detection resistor 110, serving as a detection unit for detecting an electric current, is provided in order to detect an electric current flowing between the motor driving circuit 100 and the ground. Furthermore, the motor control unit 210 obtains, at a sampling timing, a driving current based on the result of the detection by the detection unit, obtains an error evaluation value (error current signal) based on the difference between the obtained driving current and the target value of the driving current that is to be supplied to the motor, and generates a pulse signal for turning on/off the FETs based on the obtained error evaluation value, thereby controlling the motor. Here, the error evaluation value refers to a value obtained by amplifying the difference between the obtained driving current and the target value of the driving current that is to be supplied to the motor, and the amplification gain is obtained as, for example, the sum of a proportional gain and an integral gain in the PI control.

Here, if the error evaluation value at a sampling timing is not within a predetermined range, the motor control unit 210 obtains the driving current at the sampling timing based on the driving current obtained at the last sampling timing. For example, the motor control unit 210 can set the driving current at the present sampling timing to the same value as the driving current obtained at the last sampling timing. Furthermore, the motor control unit 210 can also determine the estimated value of the driving current at the present sampling timing based on the driving current obtained at the last sampling timing. This estimation may have a configuration in which an inductance value of the motor is used. On the other hand, if the error evaluation value is within the predetermined range, the motor control unit 210 obtains the driving current at the present sampling timing based on a result of detection by the detection unit at the present sampling timing.

Note that, if the pulse signal at a sampling timing has a first logical value, the motor control unit 210 determines that the driving current is flowing in the direction that corresponds to the direction of the electric current detected by the detection unit. On the other hand, if the pulse signal has a second logical value, which is different from the first logical value, the motor control unit 210 determines that the driving current is flowing in the direction that is opposite to the direction of the electric current detected by the detection unit. This is because, as explained with reference to FIG. 9, the relationship between the direction of the electric current flowing through the detection unit and the direction of the driving current when the pulse signal is in the ON state is different to when the pulse signal is in the OFF state.

Note that the motor control unit 210 generates a pulse signal by comparing an error evaluation value with a triangular wave, and the predetermined range is determined such that a period of time in which the logical value of the pulse signal does not change is longer than a predetermined period of time. Furthermore, the predetermined period of time is determined based on the period of time that is required for the FETs to switch between ON and OFF. This is because, as explained with reference to FIG. 10, if a time interval in which the logical value of the pulse signal is switched is shorter than a predetermined interval, the FETs are not switched from the ON state to the OFF state, and remain in the ON state. Furthermore, in this case, a result of the detection by the detection unit does not accurately represent the driving current, and thus the present embodiment has a configuration in which, if the error evaluation value is not within a predetermined range, the result of the detection by the detection unit at this time is not used. It is thus possible to accurately detect the driving current, making a stable motor control possible.

Accordingly, the foregoing embodiments disclose configurations in which the motor control unit 210 determines whether or not a time interval in which the pulse signal is switched before and after a sampling timing is shorter than a predetermined value. If it is determined that the time interval in which the pulse signal is switched is shorter than a predetermined value, the motor control unit 210 obtains the driving current at this sampling timing based on the driving current obtained at the last sampling timing. In the foregoing embodiments, the determination is performed by comparing the value of the error current signal at the sampling timing with a threshold. In other words, if the error current signal at the sampling timing has a value greater than or equal to the threshold 1 or a value smaller than or equal to the threshold 2, it is determined that the time interval in which the pulse signal is switched is shorter than the predetermined value. Note that even if the error current signal has a value greater than or equal to the threshold 1 or a value smaller than or equal to the threshold 2, a case may, as a result, occur in which the time interval in which the pulse signal is switched is longer than or equal to a predetermined value, but the likelihood of the occurrence of such a case is low, and is thus not an issue.

Note that the above-described detection result of the electric current of the motor is used for motor vector control or the like. For example, the motor control unit 200 determines the position of a rotor of the motor based on the current value flowing through a winding wire of the motor that was obtained in the above-described method, and determines the value, in a rotary coordinate system, of the driving current that is to be supplied according to the obtained position.

Figure 11:
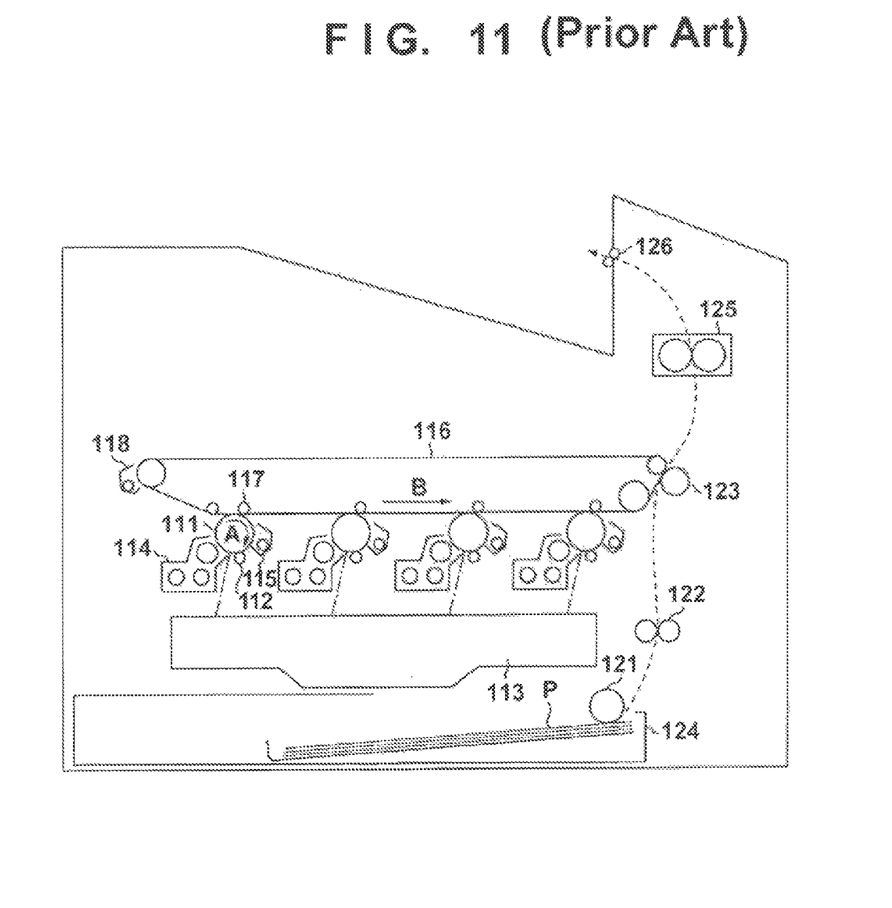
FIG. 11 is a diagram illustrating a configuration of an image forming apparatus in which the motor driving device according to the embodiments is used.

Furthermore, the motor driving devices according to the foregoing embodiments are used for driving a motor of an image forming apparatus for forming an image on a sheet. As an example, the image forming apparatus in which the motor driving device according to the present embodiment is mounted will be described with reference to FIG. 11. The image forming apparatus may be an image forming apparatus for forming a monochrome image, but here an image forming apparatus for forming a multicolor image using toners (developers) of multiple colors is envisioned. The image forming apparatus may be a printing apparatus, a printer, a copying machine, a multifunction peripheral (MFP), or a facsimile apparatus. The image forming apparatus is provided with four image forming stations for forming toner images using toners of four colors, yellow (Y), magenta (M), cyan (C), and black (K). In FIG. 11, the reference numerals are given only to the constituent components of the Y color station, but the four stations may have the same configuration. Note that each station serves as an example of an image forming unit for forming an image on image carriers, such as a photoconductive drum 111 and an intermediate transfer belt 116, using the toner.

A primary charging unit 112 uniformly charges the rotating photoconductive drum 111. An exposure unit 113 outputs laser light (a light beam) that is modulated based on an image signal, and scans the surface of the photoconductive drum 111 with the laser light. Accordingly, an electrostatic latent image is formed on the photoconductive drum 111. A developing unit 114 develops the electrostatic latent image using the toner, and forms a toner image on the photoconductive drum 111. A primary transfer roller 117 primarily transfers the toner image on the photoconductive drum 111 to the intermediate transfer belt 116. The intermediate transfer belt 116 rotates in the direction of an arrow B. The toner image on the intermediate transfer belt 116 is conveyed to a secondary transfer unit constituted by the intermediate transfer belt 116 and a secondary transfer roller 123. During this time, the toner images of the respective colors formed on the photoconductive drums 111 of the stations are primarily transferred to the intermediate transfer belt 116 successively, and thereby a multicolor toner image is formed on the intermediate transfer belt 116.

A sheet P in a sheet feeding cassette (sheet feeding unit) 124 is fed to a sheet conveyance path by a sheet feeding roller (pickup roller) 121. The sheet P may be referred to also as recording paper, recording material, recording media, a form, transfer material, transfer paper, or the like. The sheet P fed to the sheet conveyance path is conveyed to the secondary transfer unit by conveyance rollers 122. In the secondary transfer unit, the toner image conveyed by the intermediate transfer belt 116 is secondarily transferred to the sheet P. A fixing unit 125 applies heat or pressure to the toner image, and fixes the toner image onto the sheet P. Thereafter, the sheet P to which the toner image is fixed is discharged to a sheet-receiving tray (sheet-receiving unit) by sheet-discharging rollers 126. Note that the toner remaining on the surfaces of the photoconductive drums 111 and the intermediate transfer belt 116 are respectively removed (collected) by drum cleaners 115 and a belt cleaner 118.

As described above, the image forming apparatus is provided with, as rollers for conveying a sheet on which an image is to be or is formed, the rollers such as the sheet feeding roller 121, the conveyance rollers 122, and the sheet-discharging rollers 126. Motors that correspond to driving sources for driving these rollers are driven by the motor driving device according to any of the embodiments, in response to an instruction from a high-order control circuit of the image forming apparatus. Furthermore, the motors for driving the photoconductive drums 111 and the intermediate transfer belt 116 can be driven by the motor driving device in accordance with any of the embodiments.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-121424, filed on Jun. 16, 2015, and No. 2016-091655, filed on Apr. 28, 2016, which are hereby incorporated by reference herein in their entirety.

What is claimed is:

1. A motor driving device comprising:
a driving unit including a plurality of switching elements connected to each other in a bridge configuration, and configured to supply a driving current to a motor;
a detection unit configured to detect an electric current flowing between the driving unit and a ground; and
a control unit configured to control the motor by obtaining a driving current based on a detection result detected by the detection unit, and generating a PWM signal for turning on/off the plurality of switching elements based on a difference between the obtained driving current and a target value of the driving current to be supplied to the motor;
wherein, if the PWM signal is at a high level, and a time period in which the PWM signal is at the high level is longer than a predetermined time period, the control unit performs sampling of an electric current with the detection unit during the time period in which the PWM signal is at the high level, whereas if the PWM signal is at a high level but the time period in which the PWM signal is at the high level is shorter than or equal to the predetermined time period, the control unit does not perform the sampling of the electric current with the detection unit during the time period in which the PWM signal is at the high level.

2. The motor driving device according to claim 1, wherein the control unit is configured to generate the PWM signal based on a comparison between the difference and a triangular wave.

3. A motor driving device comprising:
a driving unit including a plurality of switching elements connected to each other in a bridge configuration, and configured to supply a driving current to a motor;
a detection unit configured to detect an electric current flowing between the driving unit and a ground; and
a control unit configured to control the motor by obtaining a driving current based on a detection result detected by the detection unit at a sampling timing, and generating a pulse signal for turning on/off the plurality of switching elements based on a difference between the obtained driving current and a target value of the driving current to be supplied to the motor;
wherein the control unit is further configured to, if the difference at a sampling timing is not within a predetermined range, obtain the driving current at this sampling timing based on a driving current that was obtained at a previous sampling timing.

4. The motor driving device according to claim 3, wherein the control unit is further configured to, if the difference at a sampling timing is within the predetermined range, obtain the driving current at this sampling timing based on the detection result detected by the detection unit at this sampling timing.

5. The motor driving device according to claim 3, wherein the control unit is further configured to, if the difference at a sampling timing is not within the predetermined range, set the driving current at this sampling timing to the same value as the driving current obtained at the previous sampling timing.

6. The motor driving device according to claim 3, wherein the control unit is further configured to, if the difference at a sampling timing is not within the predetermined range, estimate the driving current at this sampling timing based on the driving current obtained at the previous sampling timing.

7. The motor driving device according to claim 6, wherein the control unit is further configured to, if the difference at a sampling timing is not within the predetermined range, estimate the driving current at this sampling timing based on the driving current obtained at the previous sampling timing and an inductance value of the motor.

8. The motor driving device according to claim 3, wherein the control unit is further configured to determine that the driving current is flowing in a direction corresponding to a direction of the electric current detected by the detection unit if the pulse signal has a first polarity at a sampling timing, and to determine that the driving current is flowing in a direction corresponding to a direction opposite to the direction of the electric current detected by the detection unit if the pulse signal has a second logical value that is different from a first logical value.

9. The motor driving device according to claim 3, wherein the control unit is further configured to generate the pulse signal based on a comparison between the difference and a triangular wave, and the predetermined range is determined such that a period of time in which the logical value of the pulse signal does not change is longer than a predetermined period of time.

10. The motor driving device according to claim 9, wherein the predetermined period of time is obtained based on a period of time that is required for the plurality of switching elements to switch on from switch off or switch off from switch on.

11. A motor driving device comprising:
a driving unit including a plurality of switching elements connected to each other in a bridge configuration, and configured to supply a driving current to a motor;
a detection unit configured to detect an electric current flowing between the driving unit and a ground; and
a control unit configured to control the motor by obtaining a driving current at a sampling timing based on a detection result detected by the detection unit, and generating a pulse signal for turning on/off the plurality of switching elements based on the obtained driving current and a target value of the driving current to be supplied to the motor,
wherein the control unit is further configured to, if it is determined that a time interval from a timing when the pulse signal is switched before the sampling timing to a timing when the pulse signal is switched after the sampling timing is smaller than a predetermined value, obtain the driving current at the sampling timing based on the driving current obtained at the previous sampling timing.

12. The motor driving device according to claim 11, wherein the control unit is further configured to, if it is determined that the time interval from the timing when the pulse signal is switched before the sampling timing to the timing when the pulse signal is switched after the sampling timing is larger than the predetermined value, obtain the driving current at the sampling timing based on a detection result detected by the detection unit at the sampling timing.

13. A motor driving device comprising:
a driving unit including a plurality of switching elements connected to each other in a bridge configuration, and configured to supply a driving current to a motor;
a detection unit configured to detect an electric current flowing between the driving unit and a ground; and
a control unit configured to control the motor by obtaining a driving current based on a detection result detected by the detection unit, and generating a PWM signal for turning on/off the plurality of switching elements based on a difference between the obtained driving current and a target value of the driving current to be supplied to the motor;
wherein, if the PWM signal is at a low level, and a time period in which the PWM signal is at the low level is longer than a predetermined time period, the control unit performs sampling of an electric current with the detection unit during the time period in which the PWM signal is at the low level, whereas if the PWM signal is at a low level but the time period in which the PWM signal is at the low level is shorter than or equal to the predetermined time period, the control unit does not perform the sampling of the electric current with the detection unit during the time period in which the PWM signal is at the low level.

14. The motor driving device according to claim 13, wherein the control unit is configured to generate the PWM signal based on a comparison between the difference and a triangular wave.

\* \* \* \* \*